(No Model.)
G. FRISBEE.
FEED SUPPLY REGULATOR FOR PULVERIZERS, &c.
No. 587,686. Patented Aug. 3, 1897.
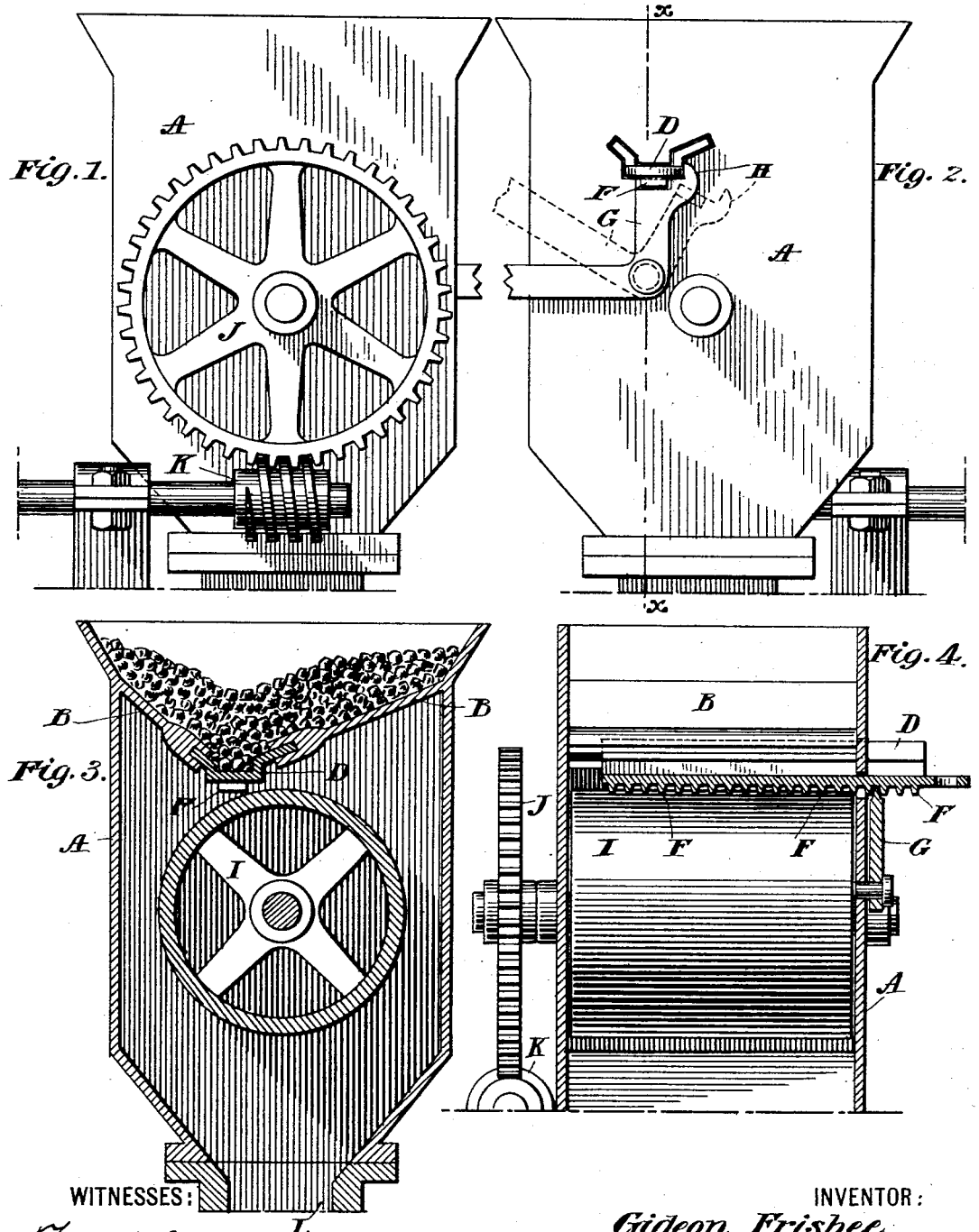
WITNESSES:
Frank S. Ober
J. S. Oswald
INVENTOR:
Gideon Frisbee.
BY
R. C. Mitchell
ATTORNEY.

UNITED STATES PATENT OFFICE.

GIDEON FRISBEE, OF PHILADELPHIA, PENNSYLVANIA.

FEED-SUPPLY REGULATOR FOR PULVERIZERS, &c.

SPECIFICATION forming part of Letters Patent No. 587,686, dated August 3, 1897.

Application filed May 29, 1896. Serial No. 593,547. (No model.)

*To all whom it may concern:*

Be it known that I, GIDEON FRISBEE, a citizen of the United States, residing at Philadelphia, in the county of Philadelphia and State of Pennsylvania, have invented a new and useful Improvement in Feed-Supply Regulators for Pulverizing and Like Machines, of which the following is a full, clear, and exact specification.

My invention relates to a feed-supply-regulating device, particularly useful in connection with pulverizing and like machines.

The object of said invention is to provide a novel means whereby the supply from the hopper to the operating-chamber is regulated.

I am aware that heretofore devices have been used for regulating the said feed-supply, but in all instances, so far as I am aware, this has been accomplished by varying the speed of what is termed the "feed-roll." By my invention, however, the speed of the feed-roll is constant and the feed-supply is varied according to the needs of the machine by a separate device not heretofore known or used, which device, in combination with other elements, comprise my invention.

My invention is illustrated by the accompanying drawings, in which—

Figure 1 is a side elevation of a feed-supply hopper, showing the means for driving the feed-roll. Fig. 2 is a side elevation of the side of said hopper opposite the side shown in Fig. 1. Fig. 3 is a vertical section of the casing illustrated in Fig. 1; and Fig. 4 is a vertical section of the hopper, taken on the line $x$ $x$ of Fig. 2.

Similar letters refer to similar parts.

A is a hopper comprising, substantially, a casing open at the top.

B B are inclined planes located within said hopper and approaching each other, substantially as shown in Fig. 3, the adjacent edges of said inclined planes being separated from each other a slight distance.

D is a sliding cut-off projecting through one side of the hopper and guided, preferably, by the adjacent edges of the inclined plane B B, which are bifurcated, as shown clearly in Fig. 3, forming recesses adapted to receive the opposite edges of the cut-off D. The lower surface of the slide D is provided with a toothed rack F, which may be attached thereto or formed integrally therewith.

G is a locking-lever pivotally connected to the outer surface of the casing A at a slight distance from the orifice in the side of the casing through which the cut-off D passes. This lever G is provided with an upwardly-projecting nose H, adapted to act as a stop, as hereinafter described. The handle portion of said lever is by preference heavier than that portion of the said lever opposite its pivotal bearing.

I is a roll located within the hopper and of any desired shape or size, the surface of the same being plain or roughened, as desired. Obviously one or more rolls may be used. This roll I is mounted upon a shaft which has its bearings in opposite sides of the casing A and so placed that the said roll will be located below and preferably in line with the opening between the lower edges of the inclined planes B B.

J is a driving-wheel mounted outside of the casing A on the shaft which carries the roll I. This driving-wheel, as illustrated, is provided with a toothed periphery, so that the same may be driven by a worm-screw K, to which rotary movement is imparted in any well-known manner.

In operation the full capacity of the roll I of the feed-supply mechanism is in use when the cut-off D is entirely withdrawn from the interior of the casing. To reduce the amount of the feed-supply, the lever G is moved into the position indicated by the dotted lines in Fig. 2, and the said cut-off may then be moved into the hopper, so as to shorten the length of the passage between the lower edges of the inclined planes B B, thus reducing the quantity of mineral or other substance which passes through said opening. It will be seen that although the speed of the roll I may be constant the feed-supply may be regulated at will. As the supply passes the roll I it descends through the casing A and is discharged through the outlet L, whence it is conducted to the interior of the operating-casing. When the cut-off is in the proper position, the lever G is moved to the position indicated in the solid lines in Fig. 2, in which the upper edge of said lever engages between two teeth of the rack F, the nose of said lever H preventing the edge of said lever from slipping entirely past the same, inasmuch as said nose abuts against the opposite side of the vane, tending to check the further movement of the lever in the direction in which it is by preference normally adapted to move by action of the heavier lever-handle which operates to tilt the lever.

Having thus described my invention, what I claim, and desire to secure by Letters Patent, is—

1. In a feed-supply hopper a revoluble feed-roll, inclined planes above said roll, the lower edges of said planes being recessed, an adjustable cut-off sliding lengthwise with respect to said planes, and moving in said recesses, a toothed rack on the lower side of said cut-off, and a locking-lever engaging with said rack, said lever being pivotally connected to the hopper-casing to one side of and below said rack.

2. In a feed-supply hopper a revoluble feed-roll, inclined planes above said roll, the lower edges of said planes being recessed, an adjustable cut-off sliding lengthwise with respect to said planes and moving in said recesses, a toothed rack on the lower side of said cut-off, and a locking-lever engaging with a rack, said lever being pivotally connected to the hopper-casing to one side of and below said rack, and a stop H carried by said lever to check the swing of said lever, substantially as described.

GIDEON FRISBEE.

Witnesses:
GEORGE W. SELTZER,
AUGUSTUS H. BECKMANN.